United States Patent Office 3,285,868
Patented Nov. 15, 1966

3,285,868
POLYVINYL CHLORIDE STABILIZED WITH MIXTURES COMPRISING POLYOLS, PHENOLS AND SALTS OF MONOCARBOXYLIC ACIDS
Arthur C. Hecker, Forest Hills, and Seymour Cohen, Brooklyn, N.Y., assignors to Argus Chemical Corporation, Brooklyn, N.Y., a corporation of Delaware
No Drawing. Filed Apr. 4, 1966, Ser. No. 539,646
16 Claims. (Cl. 260—23)

This application is a continuation-in-part of Serial No. 109,016, filed May 10, 1961, now abandoned, and Serial No. 438,370, filed March 9, 1965, now abandoned.

This invention relates to new stabilizer compositions for polyvinyl chloride resins, and to polyvinyl chloride resin compositions having improved color and better high temperature stability, incorporating such stabilizer compositions.

U.S. Patent No. 2,564,646 to Leistner, Hecker and Knoepke suggests the stabilization of polyvinyl chloride resins using a heavy metal salt of a higher fatty acid, and with this stabilizer there is also incorporated an organic phosphite or a highly hindered alkyl phenol, which serve as an anticlouding agent retarding precipitation of metal halide from the stabilizer resin composition as a cloud or haze in the stock. Supplementing this disclosure, it has also been disclosed by Leistner and Hacker in U.S. Patent No. 2,716,092 that an improved stabilizer is obtained using in combination with such heavy metal salts of higher fatty acids the polyvalent metal salts of hydrocarbon-substituted phenols. Both of these types of compositions are now widely used for the stabilization of polyvinyl chloride resins against discoloration in processing and against clouding due to separation of ingredients from the resin. However, the organic phosphite based compositions have had a wider acceptance than the compositions based on a combination of metal salt of a higher fatty acid and a hindered phenol due to the fact that the phenol while improving high temperature stability introduces a definite yellowish tint to the composition. This is not always disadvantageous, but in some uses such shades cannot be accepted.

In accordance with the instant invention, it has been determined that polyhydric alcohols of a certain structure have the property of reducing or entirely preventing yellow tint introduced by the phenol in these combinations, and may also further extend the stabilization obtained with a given amount of phenol and fatty acid salt. The polyols employed in accordance with the invention have the structure:

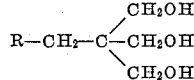

wherein R is hydrogen or an alkyl or alkoxy group. The alkyl or alkoxy group may, if desired, include additional substituents such as hydroxyl or hydroxy alkyl groups. The R radical in general has from one to about thirty carbon atoms.

Exemplary R radicals are methyl, ethyl, ispropyl, butyl, tertiary butyl, secondary butyl, isobutyl, amyl, isoamyl, hexyl, isohexyl heptyl octyl, 2-ethylhexyl, isoctyl, decyl, octadecyl, methoxy, ethoxy, hydroxypropyl, hydroxyethyloxy, hydroxy, ethyl, butoxy, propoxy, pentaerythrityloxy and hydroxyneopentyloxy.

Typical polyols include dipentaerythritol, tripentaerythritol, bis(trimethylolpropyl) ether, trimethylolpropane, trimethylolethane and trimethylolbutane. The methylene trimethylol configuration is quite important to the activity of these compounds. Pentaerythritol, glycerol and ethylene glycol, for example, are not satisfactory, and neither is mannitol nor sorbitol. The reason for this specificity of structure is not understood, however.

In conjunction with these polyols there is also employed a metal salt stabilizer for polyvinyl chloride resins, of the type described in the Leistner et al. Patent No. 2,564,646 and other patents in this field. The metal salt stabilizer is a salt of a polyvalent metal and an organic acid having from six to eighteen carbon atoms. The acid should be monocarboxylic, and it should not contain nitrogen atoms in the molecule. Aliphatic, aromatic, alicyclic and oxygen-containing heterocyclic monocarboxylic acids are operative, as a class. The acids may be substituted, if desired, with groups such as halogen, sulphur and hydroxyl. The oxygen-containing heterocyclic acids include oxygen and carbon in the ring structure of which alkyl-substituted furoic acids are exemplary. As exemplary of the acids there can be mentioned the following: caproic acid, capric acid, 2-ethyl hexoic acid, lauric acid, chlorocaproic acid, hydroxy capric acid, stearic acid, hydroxy stearic acid, palmitic acid, oleic acid, myristic acid, dodecyl thioether propionic acid

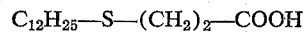

hexahydrobenzoic acid, benzoic acid, phenylacetic acid, isobutyl benzoic acid, monoethyl ester of phthalic acid, ethyl benzoic acid, isopropyl benzoic acid, monoethyl ester of phthalic acid, ethyl benzoic acid, isopropyl benzoic acid, ricinoleic acid, p-t-butylbenzoic acid, n-hexyl benzoic acid, salicyclic acid, naphthoic acid, 1-naphthalene acetic acid, orthobenzoyl benzoic acid, naphthenic acids derived from petroleum, abietic acid, dihydroabietic acid, and methyl furoic acid. These are used in the form of their metal salts, particularly the alkaline earth metal salts, such as magnesium, barium, strontium and calcium and the zinc, cadmium, lead and tin salts. Where these salts are not known, they are made by the usual types of reaction, such as by mixing the acid, acid chloride, or anhydride with the corresponding oxide or hydroxide of the metal in a liquid solvent, and heating, if necessary, until salt formation is complete. The barium, cadmium and zinc compounds are preferred.

The other essential component of the stabilizer combinations of the invention is a hydrocarbon-substituted phenol having at least one phenolic hydroxyl group, at least seven carbon atoms, and from one to about thirty carbon atoms per hydrocarbon substitutent. The phenol contains one or more phenolic hydroxyl groups, and may contain one or more phenolic nuclei. In addition, the phenolic nucleus may have an oxy or thioether substituent.

In addition, the phenol will have one or a plurality of alkyl, aryl or cycloalkyl substituents or a second ring condensed therewith as in the naphthols, having one or more carbon atoms, up to the total number of carbon atoms per hydrocarbon substituent. Usually, the phenols will have not more than about eighteen carbon atoms in any alkyl, aryl, cycloalkyl, alicyclene or alkylene group. The phenols may have from one to five substituent radicals per phenolic nucleus.

Exemplary phenols are ortho, meta and paracresol,
ortho, meta and para-phenylphenol, ortho, meta and para-xylenols,
the carvenols, symmetrical xylenol, thymol,
ortho, meta and para-nonylphenol,
ortho, meta and para-dodecyl phenol, and
ortho, meta and para-octyl phenol,
para-octyl resorcinol,
para-dodecyl resorcinol,
para-octadecyl catechol,
para-isooctyl-phloroglucinol,
p-isohexyl-catechol,
2,6-ditertiary butyl resorcinol,
2,6-diisopropyl phloroglucinol,
methylenebis-(2,6-ditertiary butyl phenol),
2,2-bis(4-hydroxy phenyl) propane,
methylenebis-(p-cresol),
4,4'-thiobisphenol,
4,4'-oxobis(3-methyl-6-isopropyl phenol),
4,4'-thiobis(3-methyl-6-tertiary butyl phenol),
2,2'-oxobis-(4-dodecyl phenol),
2,2'-thiobis(4-methyl-6-tertiary butyl phenol),
o- and m-tert-butyl-p-hydroxy anisole,
p-n-decyloxy phenol,
p-n-decyloxy cresol,
nonyl n-decyloxy cresol,
1,1,3-tris(2'-methyl-4'-hydroxy-5'-tert-butyl-phenyl) butane,
2,6-diisooctyl resorcinol,
4,4'-n-butylidenebis-(2-t-butyl 5-methyl-phenol),
4,4'-benzylidenebis-(2-t-butyl-5-methyl-phenol),
2,2'-methylenebis-(4-methyl-6-1'-methyl-cyclohexyl-phenol),
4,4'-cyclohexylidenebis-(2-t-butyl-phenol),
2,6-bis(2'-hydroxy-3'-t-butyl-5'-methylbenzyl)-4-methyl-phenol,
4-octyl pyrogallol, and
3,5-ditertiary butyl catechol,
α- and β-naphthol and mono and di-tertiary butyl substituted α- and β-naphthols.

The combination of metal salt stabilizer, substituted phenol and polyol constitute the essential stabilizers of the invention. In addition to these, there can also be employed other stabilizers normally used with polyvinyl chloride resins.

Also effective stabilizers are organic compounds containing at least one epoxy group. These compounds may be used to supplement the essential stabilizers. The amount can range from 0 to 100 parts by weight per 100 parts of resin, depending upon the effect desired, for many epoxy compounds are also plasticizers for polyvinyl chloride resins, as will be noted in the discussion which follows.

Any epoxy compound can be used. The compounds can be aliphatic or cycloaliphatic in character, but aromatic, heterocyclic and alicyclic groups can also be present. The compounds have from 10 to 150 carbon atoms. The longer chain aliphatic compounds of 22 carbon atoms and more are also plasticizers. Typical epoxy compounds that are not plasticizers are epoxy carboxylic acids such as epoxy stearic acid, glycidyl ethers of polyhydric alcohols and phenols, such as triglycidyl glycerine, diglycidyl ether of diethylene glycol, glycidyl epoxy stearyl ether, 1,4-bis(2,3-epoxypropoxy) benzene, 4,4'-bis(2,3-epoxypropoxy) diphenyl ether, 1,8-bis(2,3-epoxypropoxy) octane, 1,4-bis(2,3-epoxy-propoxy) cyclohexane, and 1,3-bis(4,5-epoxy pentoxy), 5-chlorobenzene, the epoxy polyethers of polyhydric phenols, obtained by reacting a polyhydric phenol with a halogen-containing epoxide or dihalohydrin, such as the reaction products of resorcinol, catechol, hydroquinone, methyl resorcinol or polynuclear phenols such as 2,2-bis(4-hydroxy phenyl) propane (Bisphenol A), 2,2-bis(4-hydroxyphenyl) butane, 4,4'-dihydroxybenzophenone and 1,5-dihydroxy naphthalene with halogen-containing epoxides such as 3-chloro-1,2-epoxybutane, 3-chloro-1,2-epoxyoctane, and epichlorohydrin. Typical epoxy compounds that combine stabilizing with plasticizing action are listed below under plasticizers.

A total of from 0.5 to 10 parts by weight of the stabilizers can be used for each 100 parts by weight of the resin. More stabilizer composition can be used, but usually no better result is obtained, and therefore such amounts are uneconomical and wasteful. Of this amount, from 5 to 60% is polyol, from 1 to 60% phenol, preferably from 5 to 60% phenol, and from 90 to 35% is metal salt.

The invention is applicable to any polyvinyl chloride resin. The term "polyvinyl chloride" as used herein is inclusive not only of polyvinyl chloride homopolymers but also of copolymers of vinyl chloride in a major proportion and other copolymerizable monomers in a minor proportion, such as copolymers of vinyl chloride and vinyl acetate, copolymers of vinyl chloride and vinylidene chloride, copolymers of vinyl chloride with maleic or fumaric acid, and copolymers of vinyl chloride with styrene; and also mixtures of polyvinyl chloride in a major proportion with a minor proportion of other synthetic resins such as chlorinated polyethylene or a copolymer of acrylonitrile, butadiene and styrene.

There can be incorporated a plasticizer for the resin, such as dioctyl phthalate, dioctyl sebacate and tricresyl phosphate.

Particularly useful plasticizers are the epoxy higher esters having from 22 to 150 carbon atoms. Such esters will initially have had unsaturation in the alcohol or acid portion of the molecule, which is taken up by the formation of the epoxy group.

Typical unsaturated acids are acrylic, oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethyl hexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerine is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized cottonseed oil, epoxidized tall oil fatty acid esters, epoxidized coconut oil and epoxidized tallow. Of these, epoxidized soybean oil is preferred.

The alcohol can contain the epoxy group and have a long or short chain, and the acid can have a short or long chain, such as epoxystearyl acetate, epoxystearyl stearate, glycidyl stearate, and polymerized glycidyl methacrylate.

A small amount, usually not more than 1.5% of a parting agent, also can be included. Typical parting agents are the higher aliphatic acids having from twelve to twenty-four carbon atoms, such as stearic acid, lauric acid, palmitic acid and myristic acid, mineral lubricating oils, polyvinyl stearate, polyethylene and paraffin wax.

The preparation of the stabilized composition is easily accomplished by conventional procedures. The selected stabilizer combination ordinarily is mixed with the plasticizer, and this then is blended with the polyvinyl chloride resin, using, for instance, plastic mixing rollers, at a temperature at which the mix is fluid and thorough blending facilitated, milling the plasticizer and stabilizer with the resin on a 2-roll mill at from 250 to 350° F. for a time sufficient to form a homogeneous sheet, five minutes, usually. After the mass is uniform, it is sheeted off in the usual way.

The following examples in the opinion of the inventors represent preferred embodiments of their invention:

Example 1

A series of formulations was prepared having the following composition:

| Plastic composition: | Parts by Weight |
|---|---|
| Geon 101 Ep (homopolymer of polyvinyl chloride) | 100 |
| Dioctyl phthalate | 50 |
| Stabilizer combination as noted in Table I | 1.5 |

The dioctyl phthalate and stabilizers were mixed together, and then blended with the polyvinyl chloride. The mixture was heated on a two-roll mill up to 356° F., and then tested in an oven at 350° F. for heat stability. The discoloration was noted, and is reported in Table I below.

which is undesirable for some uses. Trimethylol propane, barium laurate and cadmium laurate together (H) give good stabilization, but this endures for only one hour of heating.

The combination of barium laurate, cadmium laurate, trimethylol propane and Bisphenol A (I) is quite effective. The trimethylol propane overcomes the initial yellow tint imparted by the Bisphenol A (compare Example G), and good stabilization is obtained. Even after 120 minutes of heating only a slight yellow discoloration is noted, and this color is quite definitely superior to that of the G at the conclusion of this heating period. Thus, the results show the significance of the trimethylol propane in the stabilizer combinations of the invention.

TABLE I

| Example Number | Color | | | | |
|---|---|---|---|---|---|
| | A | B | C | D | E |
| Stabilizer | Barium Laurate 1.5 | Cadmium Laurate 1.5 | Barium Laurate 0.75, Cadmium Laurate 0.75 | Bisphenol A 1.5 | Trimethylol Propane 1.5 |
| Time of Heating: | | | | | |
| Initial | Clear | Clear | Clear | Pale Yellow Tint | Clear. |
| After 15 minutes | Brown | do | do | Borwn | Brown. |
| After 30 minutes | do | Gray with Black Edges | Clear with some Pale Yellow Discoloration | Dark Brown | Do. |
| After 45 minutes | Intensified Brown | Black | Yellow Spots | do | Dark Brown. |
| After 60 minutes | Dark Brown | do | Dark Yellow Spots | do | Do. |
| After 75 minutes | do | do | Black | do | Do. |
| After 90 minutes | Very Dark Brown | do | do | Black | Do. |
| After 105 minutes | Black | do | do | do | Do. |
| After 120 minutes | do | do | do | do | Black. |

| Example Number | Color | | | |
|---|---|---|---|---|
| | F | G | H | I |
| Stabilizer | Bisphenol A 0.75, Trimethylol propane 0.75 | Barium Laurate 0.70, Cadmium Laurate 0.70, Bisphenol A 0.1 | Barium Laurate 0.6, Cadmium Laurate 0.6, Trimethylol propane 0.3 | Barium Laurate 0.55, Cadmium Laurate 0.55, Trimethylol propane 0.3, Bisphenol A 0.1 |
| Time of Heating: | | | | |
| Initial | Pale Yellow Tint | Pale Yellow Tint | Clear | Clear. |
| After 15 minutes | Deep Amber | do | do | Do. |
| After 30 minutes | Dark Brown | do | do | Do. |
| After 45 minutes | do | do | Pale Yellow | Do. |
| After 60 minutes | do | Intensified Yellow Tint | do | Do. |
| After 75 minutes | do | do | Dark Yellow Spots | Do. |
| After 90 minutes | Black | do | Black with Yellow Spots | Slight Yellow Discoloration. |
| After 105 minutes | do | do | Black | Do. |
| After 120 minutes | do | do | do | Do. |

The above results show that barium laurate alone (A) and cadmium laurate alone (B) are quite ineffective as stabilizers. Both together (C) give some slight improvement but this endures only for 30 minutes of heating, which is not sufficient. Bisphenol A (D) and trimethylol propane (E) are quite unstaisfactory, giving no stabilizing effect even after 15 minutes of heating. The combination of Bisphenol A and trimethylol propane together (F) is no better than either alone. The combination of barium laurate, cadmium laurate and Bisphenol A (G) is fairly effective, as regards heat stabilization, but a yellow tint is imparted by the Bisphenol A initially,

Example 2

A series of polyvinyl chloride resin formulations was made up having the following composition:

| Plastic composition: | Parts by weight |
|---|---|
| Geon 101 Ep (homopolymer of polyvinyl chloride | 100. |
| Dioctyl phthalate | 45. |
| Epoxidized isooctyl ester of tall oil fatty acids | 5. |
| Stabilizer noted in Table II | As noted in Table II. |

The dioctyl phthalate, stabilizers and expoxidized tall oil fatty acid esters were mixed together and then blended with the polyvinyl chloride. The mixture was heated on a two-roll mill up to 350° F. and then tested in the oven at 350° F. for heat stability. The discoloration was noted, and is reported in Table II below:

TABLE II

| Example Number | Color | | |
|---|---|---|---|
| | J | K | L |
| Stabilizer | Calcium Stearate 1.0, Zinc Stearate 1.0, 2,6-ditertiary-butyl-para-cresol 0.5, Trimethylol ethane 0.5 | Cadmium tertiary butyl benzoate 2.0, para-tertiary-butyl-phenol 0.5, Trimethylol ethane 0.5 | Barium Laurate 0.6, Cadmium benzoate 0.,6, Bisphenol A-0.5, Dipentaerythritol 0.3 |
| Time of Heating: | | | |
| Initial | Clear | Clear | Clear |
| After 15 minutes | Pale Yellow Tint | do | Pale Yellow. |
| After 30 minutes | Yellow | Pale Yellow Tint | Do. |
| After 45 minutes | do | Intensified Yellow | Do. |
| After 60 minutes | Intensified Yellow | Yellow | Do. |
| After 75 minutes | do | Yellow with Black Edges | Do. |
| After 90 minutes | Deep Yellow | do | Do. |
| After 105 minutes | do | do | Intensified Yellow. |
| After 120 minutes | Yellow with Black Edges | Black | Do. |
| | | | Do. |

The above examples show the effectiveness of the stabilizer combinations of the invention. Example L was heated for an additional hour, at the of which time the sample retained the color at 120 minutes.

*Example 3*

Example 1 was repeated, employing as the resin Vinylite VYHH, a copolymer of 87% vinyl chloride and 13% vinyl acetate. Equivalent results were obtained.

*Example 4*

Example 2 was repeated, employing as the resin Vinylite VYHH, a copolymer of 87% vinyl chloride and 13% vinyl acetate. Equivalent results were obtained.

Having regard to the foregoing disclosed, the following is claimed as the inventive and patentable embodiments thereof:

1. A polyvinyl chloride resin stabilizer composition capable of improving the resistance of the resin to discoloration when heated at 350° F. comprising from about 1 to about 60% of a hydrocarbon substituted phenol having from one to about thirty carbon atoms per hydrocarbon substituent, from about 90 to about 35% of a polyvalent metal salt of an organic non-nitrogenous monocarboxylic acid containing from about six to about eighteen carbon atoms, or a mixture of polyvalent metal salts of organic non-nitrogenous monocarboxylic acids containing from about six to about eighteen carbon atoms, and from about 5 to about 60% of a polyol having the structure

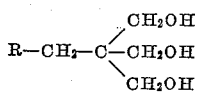

in which R is selected from the group consisting of hydrogen and an organic radical selected from the group consisting of alkyl, alkoxy, hydroxyalkyl and alkoxy hydroxyalkyl groups having from one to about thirty carbon atoms.

2. A polyvinyl chloride resin stabilizer in accordance with claim 1 in which the polyol is trimethylol propane.

3. A polyvinyl chloride resin stabilizer in accordance with claim 1 in which the polyol is dipentaerythritol.

4. A polyvinyl chloride resin stabilizer in accordance with claim 1 in which the polyol is trimethylol ethane.

5. A polyvinyl chloride resin stabilizer in accordance with claim 1 in which the phenol is 2,2-bis(4-hydroxyphenyl) propane.

6. A polyvinyl chloride resin stabilizer in accordance with claim 1 in which the polyvalent metal salt is a mixture of at least two metal salts.

7. A polyvinyl chloride resin stabilizer in accordance with claim 6 in which the polyvalent metal salts are a mixture of barium and cadmium salts.

8. A polyvinyl chloride resin stabilizer in accordance with claim 6 in which the polyvalent metal salts are mixed barium and cadmium laurates.

9. A polyvinyl chloride resin stabilizer in accordance with claim 6 in which the polyvalent metal salts are mixed barium laurate and cadmium benzoate.

10. A polyvinyl chloride resin composition having improved resistance to discoloration when heated at 350° F. comprising a polyvinyl chloride resin and a stabilizer combination comprising from about 1 to about 60% of a hydrocarbon substituted phenol having from one to about thirty carbon atoms per hydrocarbon substituent, from about 90 to about 35% of a polyvalent metal salt of an organic non-nitrogenous monocarboxylic acid containing from about six to about eighteen carbon atoms, or a mixture of polyvalent metal salts of organic non-nitrogenous monocarboxylic acids containing from about six to about eighteen carbon atoms, and from about 5 to about 60% of a polyol having the structure

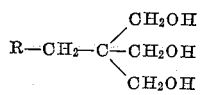

in which R is selected from the group consisting of hydrogen and an organic radical selected from the group consisting of alkyl, alkoxy, hydroxy alkyl and alkoxy hydroxyalkyl groups having from one to about thirty carbon atoms, said phenol, salt and polyol combination being present in a total amount from about 0.5 to about 10% by weight of the polyvinyl chloride resin composition.

11. A polyvinyl chloride resin composition in accordance with claim 10 which also includes up to 100 parts by weight per 100 parts of resin of an organic vicinal epoxy compound having from ten to one hundred fifty carbon atoms.

12. A polyvinyl chloride resin composition in accordance with claim 11 in which the epoxy compound is an epoxy ester having from twenty-two to one hundred fifty carbon atoms.

13. A polyvinyl chloride resin composition in accordance with claim 10 in which the polyvinyl chloride resin is a polyvinyl chloride homopolymer.

14. A polyvinyl chloride resin composition in accordance with claim 10 in which the polyvinyl chloride resin is a copolymer of vinyl chloride and vinyl acetate.

15. A polyvinyl chloride resin stabilizer composition capable of improving the resistance of the resin to discoloration when heated at 350° F. comprising from about 5 to about 60% of a hydrocarbon substituted phenol having from one to about thirty carbon atoms per hydrocarbon substituent; from about 90 to about 35% of a polyvalent metal salt of an organic non-nitrogenous monocarboxylic acid containing from about six to about eighteen carbon atoms, or a mixture of polyvalent metal salts of organic non-nitrogenous monocarboxylic acids containing from about six to about eighteen carbon atoms, and from about 5 to about 60% of a polyol having the structure

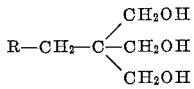

in which R is selected from the group consisting of hydrogen and an organic radical selected from the group consisting of alkyl, alkoxy, hydroxyalkyl and alkoxy hydroxyalkyl groups having from one to about thirty carbon atoms.

16. A polyvinyl chloride resin composition having improved resistance to discoloration when heated at 350° F. comprising a polyvinyl chloride resin and a stabilizer combination comprising from about 5 to about 60% of a hydrocarbon substituted phenol having from one to about thirty carbon atoms per hydrocarbon substituent, from about 90 to about 35% of a polyvalent metal salt of an organic non-nitrogenous monocarboxylic acid containing from about six to about eighteen carbon atoms, or a mixture of polyvalent metal salts of organic non-nitrogenous monocarboxylic acids containing from about six to about eighteen carbon atoms, and from about 5 to about 60% of a polyol having the structure

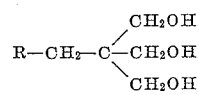

in which R is selected from the group consisting of hydrogen and an organic radical selected from the group consisting of alkyl, alkoxy, hydroxy alkyl and alkoxy hydroxyalkyl groups having from one to about thirty carbon atoms, said phenol combination, salt and polyol being present in a total amount from about 0.5 to about 10% by weight of the polyvinyl chloride resin composition.

References Cited by the Examiner
UNITED STATES PATENTS

| | | | |
|---|---|---|---|
| 2,564,646 | 8/1951 | Leistner et al. | 260—23 X |
| 2,625,521 | 1/1953 | Fischer et al. | 260—23 X |
| 2,711,401 | 6/1955 | Lally | 260—23 X |
| 2,837,490 | 6/1958 | Hecker | 260—23 X |
| 2,861,052 | 11/1958 | Elliott | 260—45.75 |
| 2,919,259 | 12/1959 | Naylor et al. | 260—45.75 |
| 2,943,070 | 6/1960 | Hecker et al. | 260—23 X |

LEON J. BERCOVITZ, *Primary Examiner.*

R. A. WHITE, *Assistant Examiner.*